3,840,682
WHIPPABLE TOPPING COMPOSITION AND PROCESS FOR PRODUCING THE SAME

Hayato Kubota, Sadao Nakayama, and Teizaburo Tateishi, Osaka, Japan, assignors to Fuji Oil Company, Ltd., Osaka, Japan
No Drawing. Continuation-in-part of abandoned application Ser. No. 4,422, Jan. 20, 1970. This application Jan. 4, 1972, Ser. No. 215,418
Int. Cl. A23g 3/00; A23l 1/14
U.S. Cl. 426—163
9 Claims

ABSTRACT OF THE DISCLOSURE

A whippable topping composition having an excellent whippable property like natural cream and useful for coating, decorating or icing in cakes, and many other foods. The composition is in an oil-in-water type emulsion consisting of 20–60 parts by weight of an edible oil and fat having a melting point not less than 10° C., 0.08–3% by weight, calculated as acetone insoluble components, of an unmodified phospholipid, 0.1–3% by weight of an edible hydrophilic surface active agent based on the weight of said oil and fat, and 80–40 parts by weight of milky solution or water.

---

This application is a continuation-in-part of U.S. application Ser. No. 4,422, filed Jan. 20, 1970 now abandoned.

This invention relates to an oily composition providing an excellent whippable property, which consists of an edible oil and fat, an unmodified phospholipid and an edible hydrophilic surface active agent and to a process for producing the same. This invention also relates to a whippable topping composition in an oil-in-water type emulsion consisting of the oily composition and a milky solution or water and to a process for producing the same.

Heretofore, there have been many studies and literatures on whippable oil-in-water type emulsions of oils and fats. However, none of such emulsions disclosed were satisfactory in such properties as whipping, standup quality or flavor. For example, emulsifiers such as glycerine mono-higher-fatty acid ester, propylene glycol mono-higher-fatty acid ester need long periods of time for whipping. Furthermore, bubbles formed therein are so large that standup quality is not kept well; i.e. formation in icing is not sharp and easily deformed. In addition, owing to roughness of internal structure of the bubbles, organoleptic properties of the products having such bubbles were extremely inferior to that of natural whipped creams. Accordingly, when the emulsions obtained by using such emulsifiers are mixed with natural whippable creams, the whipping property is reduced so much that they cannot be mixed in optional proportions with natural whippable creams. Therefore, no improvement of flavor can be obtained by adding the natural whippable cream to the emulsions.

In accordance with the former literatures, phospholipids have been rather regarded as defoaming agents. Emulsions obtained by using the phospholipids alone as emulsifiers lack in emulsion stability and over-run. Therefore, it has been hardly possible to use such emulsions in practical applications.

It is an object of the present invention to provide an oily composition suitable for providing a whipped topping. It is another object of the present invention to provide a process for producing the oily composition. It is other object of the present invention to provide a whippable topping composition in an oil-in-water type emulsion having an excellent emulsion stability and whipping property and being useful for coating, decorating or icing in manufacturing cakes and many other foods. It is a further object of the present invention to provide a process for producing the whippable topping composition. The present whippable topping composition gives an excellently whipped topping with excellent standup quality and flavor.

According to the present invention, there is provided the oily composition suitable for providing whipped topping which consists of an edible oil and fat having a melting point not less than 10° C., 0.08–3% by weight (calculated as acetone insoluble components) of an unmodified phospholipid, based on the edible oil and fat, and 0.1–3% by weight of an edible hydrophilic surface active agent based on the weight of said oil and fat. The oily composition may also contain other ingredients such as dairy products, sugars, seasonings, coloring agents and the like. The oily composition is used in an oil-in-water type emulsion.

According to the present invention, there is also provided the whippable topping composition in an oil-in-water type emulsion which consists of 20–60 parts by weight of the oily composition mentioned above and 80–40 parts by weight of a liquid selected from the group consisting of milky solutions and water. The whippable topping composition may be used alone or in an admixture with a natural whippable cream.

The edible oils and fats to be used in the present invention are those which have a melting point of 10° C. or more, preferably 25°–38° C. In other words, they are in the state of solid at temperatures below 10° C. If they are not in the state of solid, solid content in the emulsion becomes too scarce to obtain a topping excellent in whipped property and standup quality. The oils and fats used in the present invention may be either natural or synthetic. They include liquid oils, hardened oils thereof and fats. They may be used alone or in mixtures thereof. There are soybean oil, rape seed oil, kapok oil, niger seed oil, rice bran oil, olive oil, coconut oil, palmkernel oil, palm oil, tallow, hardened fish oil, hardened whale oil and the like. Solvent fractionated fats and synthetic triglycerides may also be used.

The unmodified phospholipid used in the present invention may be a mixturue of lecithin, cepharine, lipoinositol and the like obtained from vegetable oils such as soybean oil, cotton seed oil and the like or from egg yolk. So called "Lecithin" commercially available, which contains vegetable oils and fatty acids other than such phospholipids may be used. Of course, a purely isolated lecithin may also be used.

Any kind of edible hydrophilic emulsifying agents may be used. Nonionic surface active agents are particularly preferred. Typical examples of such preferred surface active agents include higher-fatty acid esters of polyglycol, higher-fatty acid esters of polyoxyethylene sorbitane, higher-fatty acid ester of saccharose, mono-glyceride of malic acid or of citric acid, and the like. Said surface active agents or emulsifying agents may be used alone or in mixtures thereof. This hydrophilic surface active agent plays a very important role in the present invention.

Milky solutions and water are milk, skimmed milk, an aqueous solution of milk powder, an aqueous solution of skimmed milk powder, water and the like. The aqueous solution of milk powder or skimmed milk powder preferably contain 5–15% by weight of milk powder or skimmed milk powder.

The phospholipid has been believed to be one of defoaming agents. In fact, if the phospholipid is used alone, over-run of whipped topping is too low to be put into practical use. For example, while the over-run (increase of volume after whipped based on the original volume) of the whipped topping is only 10–20% by volume when 1% by weight of the phospholipid is used, that of the topping is increased to as high as 90% by volume and organoleptic property of the whipped topping is also greatly enhanced when 1% by weight of the hydrophilic surface active agent such as polyglycerol monostearate is used in combination with said phospholipid. On the contrary, if the hydrophilic surface active agent is used alone, resulting emulsion cannot be sufficiently whipped. Thus, the objects of the present invention can be achieved only when the emulsifying agents are used in combination with phospholipid. That is, satisfactory over-run cannot be obtained by using a phospholipid alone, and the resulting emulsion cannot be sufficiently whipped by using a hydrophilic surface active agent alone. Using the hydrophilic emulsifiers together with phospholipid gives satisfactory over-run excellent in whipping property, standup quality and organoleptic property.

The amount of the phospholipid used in the present invention is critical. It ranges from 0.08% to 3%, preferably from 0.2% to 1% by weight (calculated as acetone insoluble components; i.e. lecithin, cepharine, lipoinositol, and the like) based on the weight of the oil and fat. If the phospholipid is used in an amount less than 0.08% by weight, satisfactory whipping property cannot be obtained. On the other hand, if it is used in an amount more than 3% by weight, organoleptic properties and flavor of resulting cream become deteriorated as the result of hardening.

The amount of a hydrophilic surface active agent is also critical. It may range from 0.1% to 3%, preferably from 0.1% to 1% by weight based on the weight of the oil and fat. If the hydrophilic surface active agent is used in an amount less than 0.1%, the over-run obtained is too low. On the other hand, if it is used in an amount more than 3% by weight, an emulsion obtained cannot be whipped even if the phospholipid is used in combination therewith.

The present composition may be prepared by simply mixing the components. Order of mixing is not critical. For example, lecithin is first mixed to oil and fat. The mixture obtained is then mixed with a mixture of the hydrophilic surface active agent and the milky solution or water. Any convenient method will serve for preparing the composition. A preferred embodiment is as follows: A mixture consisting of an oil and fat, an unmodified phospholipid and hydrophilic surface active agent is prepared by mixing the components in a mixer under atmospheric pressure at a temperature between 60° and 80° C. An oil-in-water type emulsion is prepared by adding to the mixture a sufficient amount of the milky solution or water. Then the emulsion is vigorously agitated in a homogenizer under a pressure in the range of 10–150 kg./cm.², preferably 20–100 kg./cm.² until the emulsion is entirely homogenized.

The present invention will be described in further detail by referring to the following examples. It should be understood that the following examples are given only for illustrative purposes and the scope of the present invention is not restricted thereto.

EXAMPLE 1

50 Parts by weight of a mixture consisting of a hardened soybean oil having a melting point of 36° C., 1.5% by weight of a soybean lecithin (products sold by Honen Oil Co., Ltd., Japan, containing 70% by weight of acetone insoluble components) and 0.5% by weight of polyglycerol monostearate (Decaglycerol monostearate, sold by Drew Chemical Corp., U.S.A.) based on the weight of the hardened soybean oil; and 50 parts by weight of milk were mixed in a homomixer at 70° C. to obtain an oil-in-water type emulsion. Then, the emulsion was passed into a homogenizer under a pressure of 80 kg./cm.². After the emulsion was homogenized completely, it was cooled by ice water to 10° C.

The emulsified composition thus obtained was allowed to stand at 5° C. for overnight. Then, it was stirred in a whipper. A topping excellent in whipping and standup quality was obtained. Over-run of the whipped cream was 90%.

EXAMPLE 2

Example 1 was repeated except polyglycerol distearate was used in place of polyglycerol monostearate described therein. There was obtained the similar result as described in Example 1.

EXAMPLE 3

Example 1 was repeated except that polyglycerol tristearate was used in place of polyglycerol monostearate described therein, to obtain the same result as described in Example 1.

EXAMPLE 4

An emulsion was prepared in the same manner as described in Example 1 except that 0.6% by weight of polyoxyethylene sorbitane monostearate (Tween 60, sold by Kaō-Atlas Co., Japan) was used in place of polyglycerol ester.

The same result as described in Example 1 was obtained.

EXAMPLE 5

Example 4 was carried out by substituting polyoxyethylene sorbitane distearate for polyoxyethylene sorbitane monostearate described therein, to obtain the same result as described in Example 1.

EXAMPLES 6–8

Emulsions were prepared in the same manner as described in Example 1 except that 0.4% by weight of saccharose monostearate, 0.5% by weight of monoglyceride of maleic acid and 0.5% by weight of monoglyceride of citric acid were used respectively instead of polygylcerol ester.

Any one of them gives the same result as described in Example 1.

EXAMPLE 9

45 Parts by weight of a mixture consisting of a hardened coconut oil having a melting point of 33° C., 1.5% by weight, calculated as acetone insoluble components, of lecithin derived from egg yolk and 0.5% by weight of decaglycerol monostearate based on the weight of the oil, and 55 parts by weight of a milky solution which was prepared by mixing 50 parts by weight of water with 5 parts by weight of skimmed milk powder were mixed in a mixer at 70° C. to obtain a homogeneous oil-in-water type emulsion. Then the emulsion was passed into a homogenizer under a pressure of 80 kg./cm.². After the emulsion was homogenized completely, it was cooled by ice water to 7° C.

The emulsified composition thus obtained was allowed to stand at 5° C. overnight. Then, it was stirred in a whipper. A topping excellent in whipping and standup quality was obtained. Over-run of the whipped cream was 85%.

The whippable topping composition obtained in Examples 1–9 could be mixed with various amounts of natural whippable cream. Any one of them proved to be excellent whippable cream having the characteristics of the present invention.

What we claim is:

1. An oily composition suitable for providing whippable topping which comprises an edible oil, fat, or mixture thereof having a melting point not less than 10° C., 0.08–3% by weight, calculated as acetone insoluble components, of an unmodified phospholipid based on the weight of said oil, fat, or mixture thereof and 0.1–3% by weight of an edible hydrophilic surface active agent based on the weight of said oil, fat, or mixture thereof, said hydrophilic surface active agent being nonionic and being selected from the group consisting of higher-fatty acid esters of polyglycerols, higher-fatty acid esters of polyoxyethylene sorbitane, higher-fatty acid esters of saccharose, and monoglycerides of malic acid and citiric acid.

2. An oily composition according to Claim 1 wherein the oil, fat or mixture thereof is one having a melting point between 25° and 38° C.

3. An oily composition according to Claim 1 wherein the phospholipid is in an amount of 0.2–1% by weight and the edible hydrophilic agent is in an amount of 0.1–1% by weight based on the weight of said oil and fat.

4. A whippable topping composition in an oil-in-water type emulsion which comprises 20–60 parts by weight of an oily composition comprising an edible oil, fat, or mixture thereof having a melting point of not less than 10° C., 0.08–3% by weight, calculated as acetone insoluble components, of an unmodified phospholipid, based on the weight of said oil, fat, or mixture thereof, 0.1–3% by weight of an edible hydrophilic surface active agent based on the weight of said oil, fat, or mixture thereof, and 80–40 parts by weight of a liquid selected from the group consisting of milky solutions and water, said hydrophilic surface active agent being nonionic and being selected from the group consisting of higher-fatty acid esters of polyglycerols, higher-fatty acid esters of polyoxyethylene sorbitane, higher-fatty acid esters of saccharose, and mono-glycerides of malic acid and citric acid.

5. A whippable topping composition according to Claim 4 wherein the oil and fat are those having a melting point between 25° and 38° C.

6. A whippable topping composition according to Claim 4 wherein the phospholipid is in an amount of 0.2–1% by weight and the edible hydrophilic surface active agent is in an amount of 0.1–1% by weight based on the weight of said oil and fat.

7. A whippable topping composition according to Claim 4 wherein the liquid is selected from the group consisting of milk, skimmed milk, an aqueous solution of milk powder, an aqueous solution of skimmed milk powder and water.

8. A process for preparing an oily composition suitable for providing a whippable topping which comprises mixing, at 60–80° C., an edible oil, fat, or mixture thereof having a melting point not less than 10° C., 0.08–3% by weight, calculated as acetone insoluble components, of an unmodified phospholipid based on the weight of said oil, fat, or mixture thereof, and 0.1–3% by weight of an edible hydrophilic surface active agent based on the weight of said oil, fat, or mixture thereof, said hydrophilic surface active agent being nonionic and being selected from the group consisting of higher-fatty acid esters of polyglycerols, higher-fatty acid esters of polyoxyethylene sorbitane, higher-fatty acid esters of saccharose, and mono-glycerides of malic acid and citric acid.

9. A process for preparing a whippable topping composition which comprises mixing, at 60–80° C., 20–60 parts by weight of an oily composition comprising an edible oil, fat, or mixture thereof having a melting point not less than 10° C., 0.08–3% by weight, calculated as acetone insoluble components, of an unmodified phospholipid based on the weight of said oil, fat, or mixture thereof, and 0.1–3% by weight of an edible hydrophilic surface active agent based on the weight of said oil, fat, or mixture thereof, said hydrophilic surface agent being nonionic and being selected from the group consisting of higher-fatty acid esters of polyglycerols, higher-fatty acid esters of polyoxyethylene sorbitane, higher-fatty acid esters of saccharose, and mono-glycerides of malic acid and citric acid, and 80–40 parts by weight of a liquid selected from the group consisting of milky solution and water, and homogenizing the resulting mixture under a pressure of 10–150 kg./cm.$^2$.

References Cited
UNITED STATES PATENTS

| | | | |
|---|---|---|---|
| 3,295,986 | 1/1967 | Saslaw et al. | 99—139 XR |
| 3,533,802 | 10/1970 | Cooper et al. | 99—139 XR |
| 3,199,988 | 8/1965 | Kozlik et al. | 99—139 |
| 3,479,190 | 11/1969 | Ganz | 99—139 |
| 2,913,342 | 11/1959 | Cameron | 99—139 XR |
| 3,431,117 | 3/1969 | Lorant | 99—139 |

A. LOUIS MONACELL, Primary Examiner

J. M. HUNTER, Assistant Examiner